United States Patent
Fabrizio et al.

(10) Patent No.: US 10,203,403 B2
(45) Date of Patent: Feb. 12, 2019

(54) LOW-COST UNDERWATER ACOUSTIC SYSTEM FOR REAL-TIME THREE-DIMENSIONAL IMAGING

(71) Applicant: LEONARDO S.p.A., Rome (IT)

(72) Inventors: Ferraioli Fabrizio, Rome (IT); Marasco Renato, Rome (IT)

(73) Assignee: LEONARDO S.P.A., Rome (IT)

( * ) Notice: Subject to any disclaimer, the term of this patent is extended or adjusted under 35 U.S.C. 154(b) by 173 days.

(21) Appl. No.: 15/433,940

(22) Filed: Feb. 15, 2017

(65) Prior Publication Data
US 2018/0231647 A1 Aug. 16, 2018

(51) Int. Cl.
*G01S 7/52* (2006.01)
*G01S 7/527* (2006.01)
*G01S 15/89* (2006.01)

(52) U.S. Cl.
CPC ........ *G01S 7/52003* (2013.01); *G01S 7/5273* (2013.01); *G01S 15/89* (2013.01)

(58) Field of Classification Search
CPC ..... G01S 7/52003; G01S 15/89; G01S 7/5273
See application file for complete search history.

(56) References Cited

U.S. PATENT DOCUMENTS

| | | | |
|---|---|---|---|
| 3,784,805 A | 1/1974 | Rolle | |
| 5,200,931 A | 4/1993 | Kosalos et al. | |
| 5,797,845 A | 8/1998 | Barabash et al. | |
| 2009/0310438 A1 | 12/2009 | Sloss | |
| 2018/0231647 A1* | 8/2018 | Fabrizio | G01S 7/52003 |

FOREIGN PATENT DOCUMENTS

| | | | | |
|---|---|---|---|---|
| EP | 2299292 A1 | 3/2011 | | |
| EP | 3171200 A1 * | 5/2017 | ........... | G01S 7/6245 |
| IT | UB20155821 A1 * | 5/2017 | ........... | G01S 7/6245 |

OTHER PUBLICATIONS

Italian Search Report received for Italian Appl. No. UB20155821 dated Jul. 18, 2016.
Knudsen, "A New Digital Beamformer for Acoustic Imaging", Institute of Electrical and Electronics Engineers: Acoustics, Arctic Studies. Seattle, Sep. 18-21, 1989; [Proceedings of the Oceans Conference], New York, IEEE, US, Sep. 18, 1989 (Sep. 18, 1989), pp. 1021-1026, XP000130437.

* cited by examiner

*Primary Examiner* — Daniel Pihulic
(74) *Attorney, Agent, or Firm* — Dorsey & Whitney LLP (57) ABSTRACT

Examples described herein include an acoustic system for the imaging of underwater objects, comprising an underwater transceiver antenna of electro-acoustic type, and control and processing means configured to carry out an imaging step.

10 Claims, 6 Drawing Sheets

LOW-COST UNDERWATER ACOUSTIC SYSTEM FOR REAL-TIME THREE-DIMENSIONAL IMAGING

CROSS-REFERENCE TO RELATED APPLICATIONS

This application is related to Italian Patent Application No. 102015000075601 filed on Nov. 23, 2015, the disclosure of which is incorporated herein by reference in its entirety for any purpose.

TECHNICAL FIELD

The present invention relates, in general, to an acoustic system for the imaging of underwater objects.

In particular, examples described herein include a low-cost underwater acoustic system for real-time three-dimensional (3D) imaging applications.

Examples of the present invention find advantageous, but not exclusive, application in those operating scenarios where the use of underwater optical systems is severely limited or even impossible (for example, due to scarce visibility under water).

BACKGROUND

As is known, in some technical applications it is necessary to examine underwater objects in high resolution (for example, for recovering archaeological finds or submerged wrecks, or for salvaging sunken sea/submarine/amphibious craft). Unfortunately, however, the known types of underwater acoustic imaging systems are not capable of providing high-resolution 3D images in real time and at a short distance.

SUMMARY

Therefore, one aspect of examples described herein is to provide an underwater acoustic imaging system capable of:
in general, at least partially overcoming the technical drawbacks of known types of underwater acoustic imaging systems; and,
in particular, providing high-resolution 3D images of underwater objects, expediently in real time and at a short distance.

This and other aspects may be achieved by examples of the present invention in so far as it relates to an acoustic system for the imaging of underwater objects, as defined in the appended claims.

In particular, example systems according to the present invention may comprise an underwater transceiver antenna of an electro-acoustic type, and control and processing means; said control and processing means are configured to carry out an imaging step including:
transmitting, by means of the underwater transceiver antenna and for each azimuth angle included in a predetermined range of azimuth angles, a corresponding acoustic pulse by
using a fan beam pointed at said azimuth angle and having a predetermined width in azimuth and a predetermined width in elevation, wherein said predetermined width in elevation is greater than said predetermined width in azimuth, and
feeding the underwater transceiver antenna with excitation signals such as to cause a coherent recombination of corresponding acoustic signals transmitted in water at a three-dimensional focusing region located at a predetermined focusing distance from the underwater transceiver antenna, at which predetermined focusing distance an underwater object is located;
wherein the acoustic pulses are transmitted by varying azimuth pointing of the fan beam so as to perform a complete scan of the predetermined range of azimuth angles;
for each acoustic pulse transmitted, receiving a corresponding echo signal by means of the underwater transceiver antenna;
processing the received echo signals by performing a beamforming method so as to compute a three-dimensional digital map of powers associated with a predetermined grid of points located in the three-dimensional focusing region; wherein the received echo signals are processed by forming pencil beams, each of which is pointed at a corresponding point of said predetermined grid; and
processing the three-dimensional digital map of powers by performing an edge detection method so as to form an image of the underwater object.

Preferably, the control and processing means are configured to carry out the imaging step by feeding the underwater transceiver antenna with square-wave excitation signals having predetermined delays such as to cause a coherent recombination of the corresponding acoustic signals transmitted in water at the three-dimensional focusing region.

BRIEF DESCRIPTION OF THE DRAWINGS

For a better understanding of examples described herein, some preferred embodiments, provided by way of non-limitative example, will now be described with reference to the accompanying drawings (not to scale), in which.

DETAILED DESCRIPTION

Figure 1:
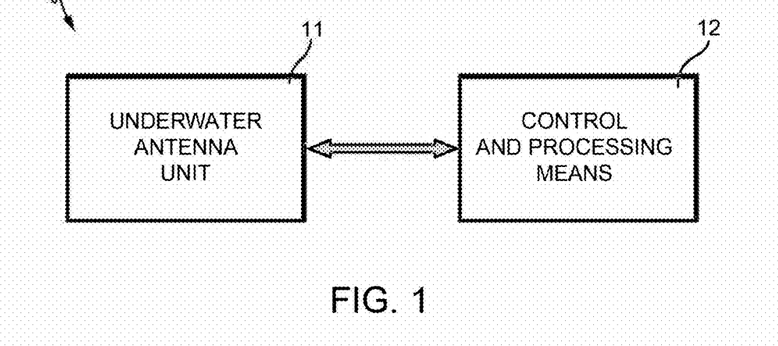
FIG. 1 schematically shows an acoustic system for the imaging of underwater objects according to a preferred embodiment of the present invention.

In FIG. 1, reference numeral 1 indicates, as a whole, an underwater acoustic imaging system according to a preferred embodiment of the present invention.

In particular, as schematically shown in FIG. 1, the system 1 includes:
- an underwater antenna unit 11 according to a first aspect of the present invention; and
- control and processing means 12 configured to control the transmission and reception operation of said underwater antenna unit 11 and to process the received signals through the implementation of a method for imaging underwater objects according to a second aspect of the present invention.

The system 1 can be advantageously employed in search, location, identification and salvage applications of underwater objects (such as, for example, archaeological finds or submerged wrecks, sunken sea/submarine/amphibious craft, etc.).

Figure 2:
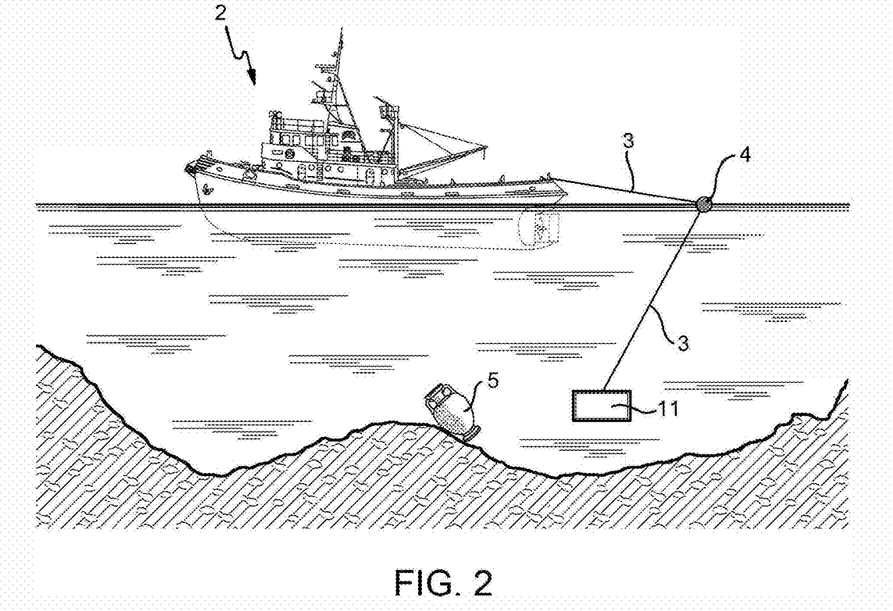
FIG. 2 schematically shows an example of an operational scenario of the system in FIG. 1.

With regard to this, FIG. 2 schematically shows an example of an operational scenario of the system 1, in which a ship 2, connected to the underwater antenna unit 11 by one or more cables 3 passing through a buoy 4, is used.

Preferably, the control and processing means 12 are implemented using a distributed architecture. In particular, said control and processing means 12 may expediently include:
- excitation means (not shown), which are coupled to the underwater antenna unit 11 to operate it in transmission (e.g. excitation circuitry and/or components);
- acquisition means (not shown), which are coupled to the underwater antenna unit 11 to acquire the signals received by the latter and to carry out preliminary processing on the received signals (e.g. amplifiers, filters, analog-to-digital converters, etc.); and
- a central control and processing unit (not shown), which can, for example, be installed on the ship 2 and be connected to said excitation and acquisition means via said cable(s) 3 and which is programmed (for example, utilizing one or more opportune portions of software code) to control the operation of the entire system 1 and to process the received signals (downstream of the pre-processing performed by the acquisition means) in order to form 3D images of underwater objects.

In particular, in the example in FIG. 2, the system 1 is used for to search for, locate, identify and salvage a submerged archaeological find 5.

Figure 3:
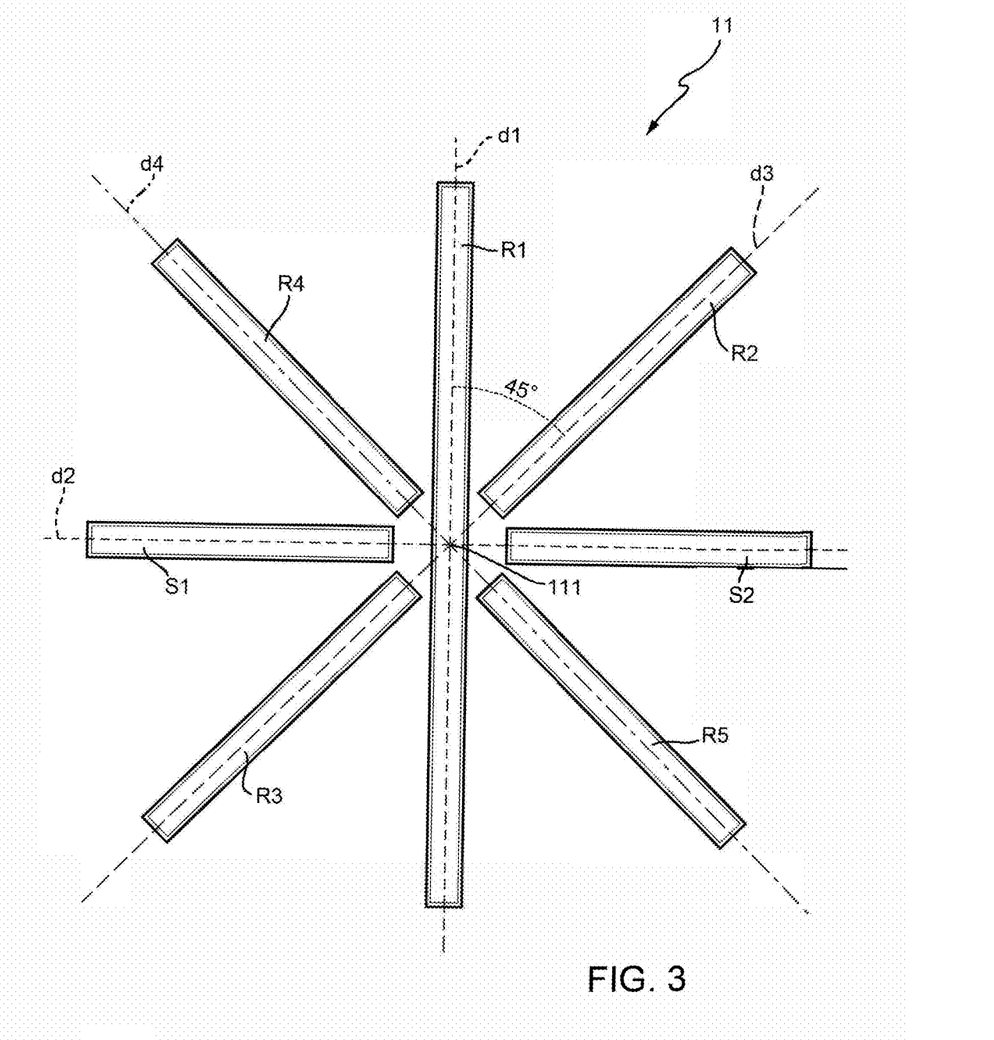
FIG. 3 shows a preferred embodiment of a underwater antenna unit of the system in FIG. 1, wherein said underwater antenna unit is made according to the principles of a first aspect of the present invention.

FIG. 3 shows a preferred embodiment of the underwater antenna unit 11 according to the first aspect of the present invention.

In particular, as shown in FIG. 3, the underwater antenna unit 11 comprises:
- a transmitting antenna, which includes two arrays of active electro-acoustic transducers S1 and S2, that lie on a same plane P1, and
- a receiving antenna, which includes five arrays of passive electro-acoustic transducers R1, R2, R3, R4 and R5 that lie on said plane P1;

in which:
- a first array of passive electro-acoustic transducers R1 extends mainly along a first rectilinear direction d1 that lies on said plane P1 and identifies an elevation direction;
- the two arrays of active electro-acoustic transducers S1 and S2 extend mainly along a second rectilinear direction d2 that lies on said plane P1, is perpendicular to the first rectilinear direction d1 and intersects said first rectilinear direction d1 at a point 111 identifying a phase centre of the underwater antenna unit 11;
- the second rectilinear direction d2 identifies an azimuth direction;
- the two arrays of active electro-acoustic transducers S1 and S2 extend along the second rectilinear direction d2, each on a respective side with respect to the phase centre 111;
- the first array of passive electro-acoustic transducers R1 extend through the phase centre 111 and on both sides with respect to said phase centre 111 along the first rectilinear direction d1;
- a second and a third array of passive electro-acoustic transducers R2 and R3 extend mainly along a third rectilinear direction d3 that lies on said plane P1, passes through the phase centre 111 and is inclined by 45° with respect to both the first rectilinear direction d1 and the second rectilinear direction d2;
- the second and third arrays of passive electro-acoustic transducers R2 and R3 extend along the third rectilinear direction d3, each on a respective side with respect to the phase centre 111;
- a fourth and a fifth array of passive electro-acoustic transducers R4 and R5 mainly extend along a fourth rectilinear direction d4 that lies on said plane P1, passes through the phase centre 111 and is inclined by 45° with respect to both the first rectilinear direction d1 and the second rectilinear direction d2 and by 90° with respect to the third rectilinear direction d3; and
- the fourth and fifth arrays of passive electro-acoustic transducers R4 and R5 extend along the fourth rectilinear direction d4, each on a respective side with respect to the phase centre 111.

Preferably, the respective active electro-acoustic transducers of each of the two arrays S1 and S2 are spaced apart from one another according to a first spacing law, while the respective passive electro-acoustic transducers of each of the five arrays R1, R2, R3, R4 and R5 are spaced apart from one another according to a second spacing law, which may coincide with, or be different from, said first spacing law.

Conveniently, the first spacing law envisages that, in each of the two transmitting arrays S1 and S2, the spacing between the barycentres of adjacent active electro-acoustic transducers increases with increasing distance from the phase centre 111 according to a first nonlinear law, preferably a first logarithmic law.

Conveniently, the second spacing law similarly envisages that, in each of the five receiving arrays R1, R2, R3, R4 and R5, the spacing between the barycentres of adjacent passive electro-acoustic transducers increases with increasing distance from the phase centre 111 according to a second nonlinear law, preferably a second logarithmic law.

Preferably, the active and passive electro-acoustic transducers (for example, of the piezoelectric type) operate in the range 650-750 kHz.

Conveniently, the arrays S1, S2, R1, R2, R3, R4 and R5 are housed/placed/fastened on a base structure designed to dampen vibrations.

The underwater antenna unit 11 also conveniently comprises covering means made of an acoustically transparent material, arranged to protect the arrays S1, S2, R1, R2, R3, R4 and R5.

Figure 4:
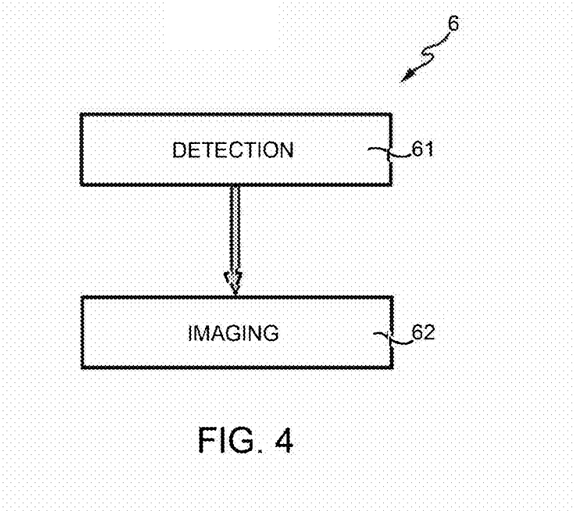
FIG. 4 schematically shows a preferred embodiment of a method for imaging underwater objects according to a second aspect of the present invention.

FIG. 4 schematically shows a preferred embodiment of the imaging method (indicated as a whole by reference numeral 6) implemented, in use, by the control and processing means 12, e.g. of the method for imaging underwater objects according to a second aspect of examples of the present invention.

In particular, the method 6 includes:
- a detection step (block 61) for detecting the presence of underwater objects and, for each detected object, a respective in-range distance of said object from the underwater antenna unit 11; and an imaging step (block 62) for reconstructing an image of the detected object, in particular an image of the silhouette of said detected object.

In particular, the detection step (block 61) comprises:

transmitting isotropic acoustic pulses, i.e. unfocused ones, by activating, in transmission, the active electro-acoustic transducers arranged in a central area of the underwater antenna unit 11; and, for each isotropic acoustic pulse transmitted, receiving a corresponding echo signal by activating, in reception, the passive electro-acoustic transducers arranged in a central area of the underwater antenna unit 11, computing average powers of samples of said echo signal by using a sliding window of integration of squared amplitudes of the samples of said echo signal, weighting the computed average powers by an exponential function of compensation for spherical divergence attenuation, detecting one or more underwater objects on the basis of the weighted average powers, and a detection threshold, which can be set manually by an operator (for example, via an opportune user interface coupled to the control and processing means 12), or which is preferably automatically computed by said control and processing means 12, and determining, for each detected object, a respective distance of said object from the underwater antenna unit 11.

As already explained, only a few active electro-acoustic transducers are employed in the detection step (block 61), these being arranged in the central area of the underwater antenna unit 11 to transmit isotropic acoustic pulses, i.e. unfocused ones.

Conveniently, the active electro-acoustic transducers arranged in said central area of the underwater antenna unit 11 are fed with square-wave excitation signals in the detection step (block 61).

Preferably, the duration of the pulses transmitted during the detection step (block 61) is greater than the duration of the pulses transmitted during the imaging step (block 62).

Conveniently, an opportune analogue-digital conversion is applied to the echo signals received during the detection step (block 61).

Preferably, the echo signals received during the detection step (block 61) are analysed with a filter estimating the average noise power. This average noise power can then be conveniently used for estimating the detection threshold in an adaptive manner.

Figure 5:
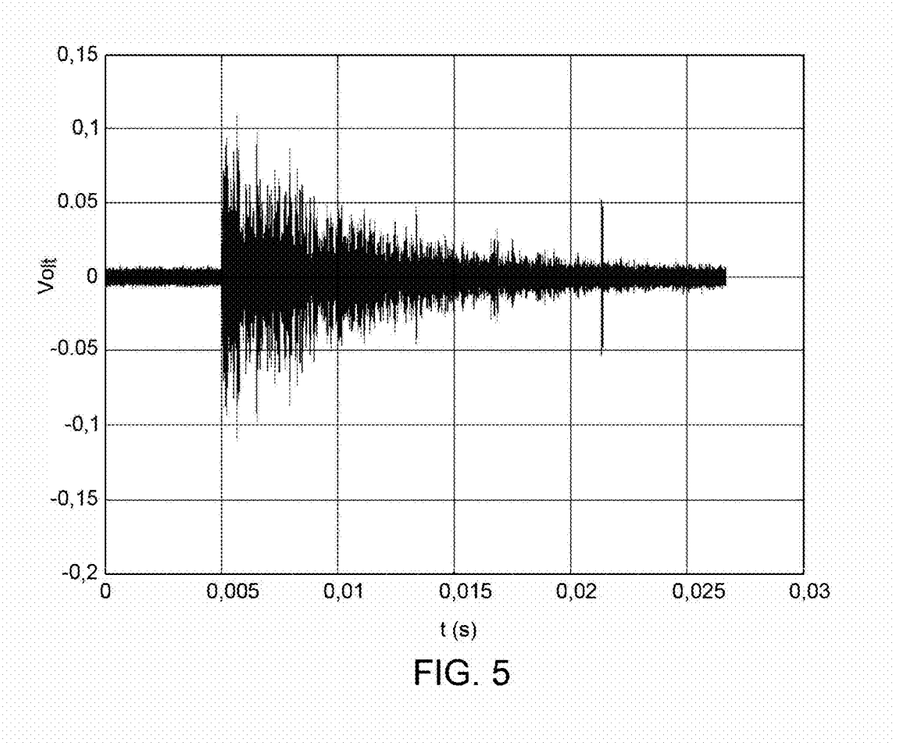
FIG. 5 shows an example of the echo signal received during a detection step of the method in FIG. 4.

An example of the echo signal received during the detection step (block 61) is shown in FIG. 5, where it can be noted that reception is only enabled after a time corresponding to a predetermined blind distance and is interrupted, for simplicity, before the arrival of the echo from the bottom or from the surface of the sea.

As previously explained, the average powers of the samples of an echo signal received during the detection step (block 61) (for example, the signal shown in FIG. 5) are computed using a sliding window of integration of squared amplitudes of the samples, thereby obtaining the following sequence of average power samples:

$$P(t_k) = e^{\beta(t_k - t_G)} \sum_{i=1}^{N_c} (x(t_{k-i}))^2 \quad t_k \geq t_G,$$

where $t_G$ indicates the aforementioned time related to the predetermined blind distance.

Conveniently, the sliding window comprises a number $N_c$ of samples related to the duration of the transmitted pulse and is translated with 75% overlap.

Figure 6:
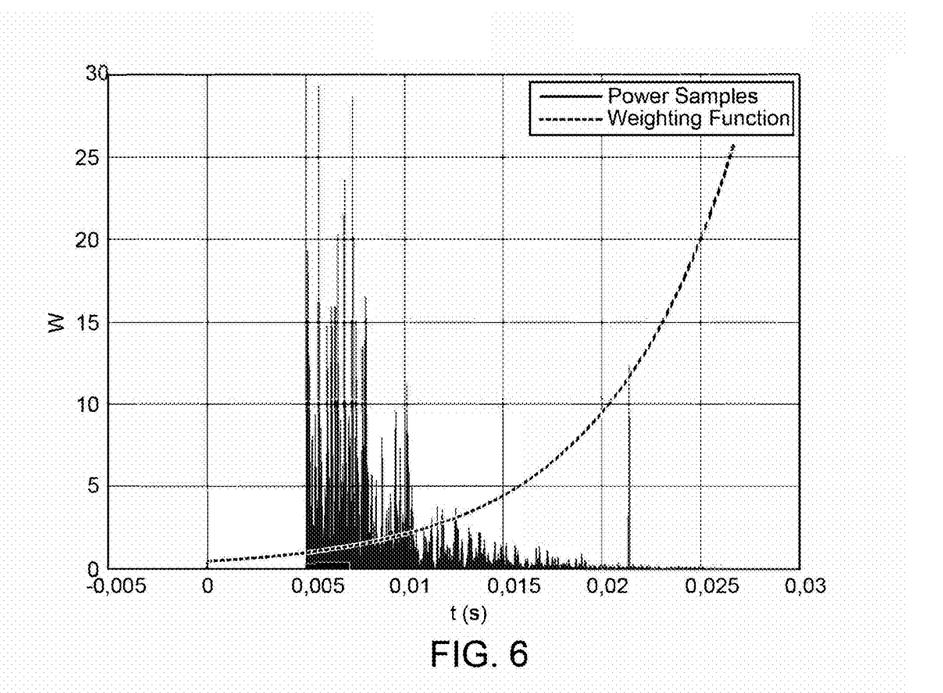
FIG. 6 shows an example of average power samples computed during said detection step of the method in FIG. 4, and also an example of an exponential weighting function used during said detection step.
Figure 7:
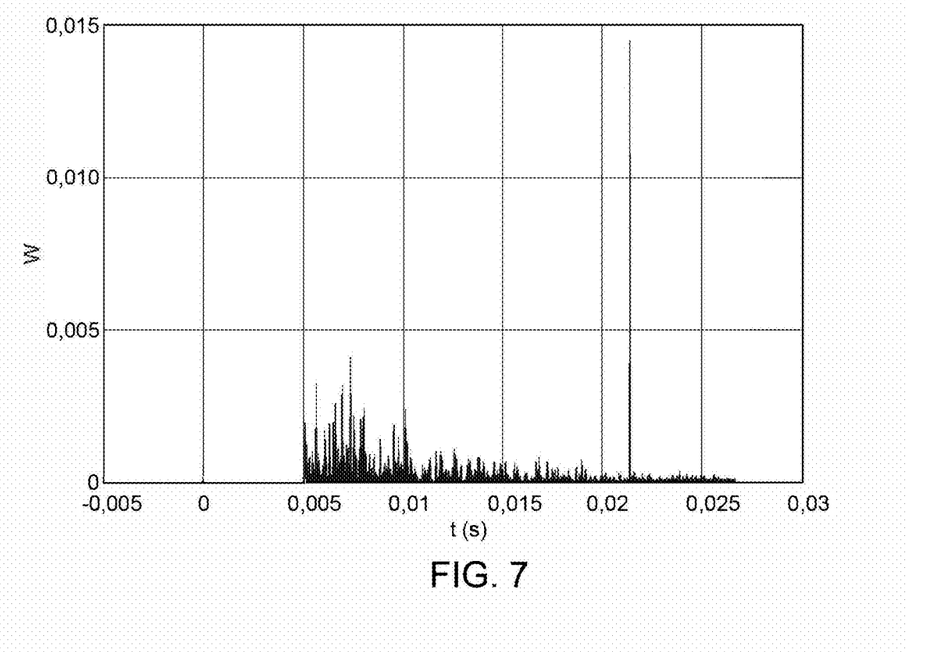
FIG. 7 shows an example of weighted samples computed during said detection step.

The average power samples are then weighted by means of an exponential function that takes into account the spherical divergence attenuation of the level of reverberation as function of distance and, therefore, of time. With regard to this, an example of average power samples, as well as an example of the exponential weighting function, are shown in FIG. 6; in addition, the corresponding weighted samples are shown in FIG. 7.

Once the weighted average power samples have been obtained, the detection step (block 61) can conveniently proceed in the following manner:

the amplitudes and times associated with the first N samples of highest power, separated in time by more than Q times the duration of the pulse (for example, M=2 and Q=4) are stored;

these samples and those adjacent within a range of ±B (for example, B=4) are ignored and the maximum value in the remaining samples is searched for;

the two maximum power values are assigned to echoes originating from a target that exceed the mean value by 4 dB;

if only one of the maximums passes the test, the corresponding time allows determining the distance; if both pass the test, the maximum with the smaller corresponding time is considered; instead, if neither of the two values pass the test, it is assumed that there are no targets for the transmitted pulse.

The distance can be conveniently determined in one of the following three ways:

a) processing the powers of the signals as described above in a completely automatic manner; or b) leaving the decision of identifying the time of the echo of a possible target based on the received powers to an operator; or c) providing distance information directly to an operator without anything regarding the received signal.

Instead, with regards to the imaging step (block 62), this comprises:

transmitting, for each azimuth angle included in a predetermined range of azimuth angles, a corresponding acoustic pulse by using a fan beam very narrow in azimuth (for example, with a width in azimuth of even less than 1°), wherein said fan beam is pointed at said azimuth angle and has a predetermined width in elevation much larger than the width in azimuth (for example, a predetermined width in elevation of 40°), and feeding the active electro-acoustic transducers with square-wave excitation signals such as to cause a coherent recombination of corresponding acoustic signals transmitted in water at a three-dimensional focusing region located at a given focusing distance from the underwater antenna unit 11, at which given focusing distance an underwater object has been detected;

wherein the acoustic pulses are transmitted by varying, for each new acoustic pulse to be transmitted, the azimuth pointing of the fan beam so as to perform a complete scan of the predetermined range of azimuth angles;

for each acoustic pulse transmitted, receiving a corresponding echo signal by activating, in reception, the passive electro-acoustic transducers;

processing the received echo signals by performing a beamforming method so as to compute a three-dimensional digital map of powers associated with a predetermined grid of points located in the three-dimensional focusing region; wherein the echo signals related to a same azimuth pointing are processed by forming pencil beams, each of which is pointed at a corresponding point of said predetermined grid; and processing the three-dimensional digital map of powers by performing an edge detection method (for example, double-threshold-based) so as to form an image of the contours of the detected object.

Figure 8:
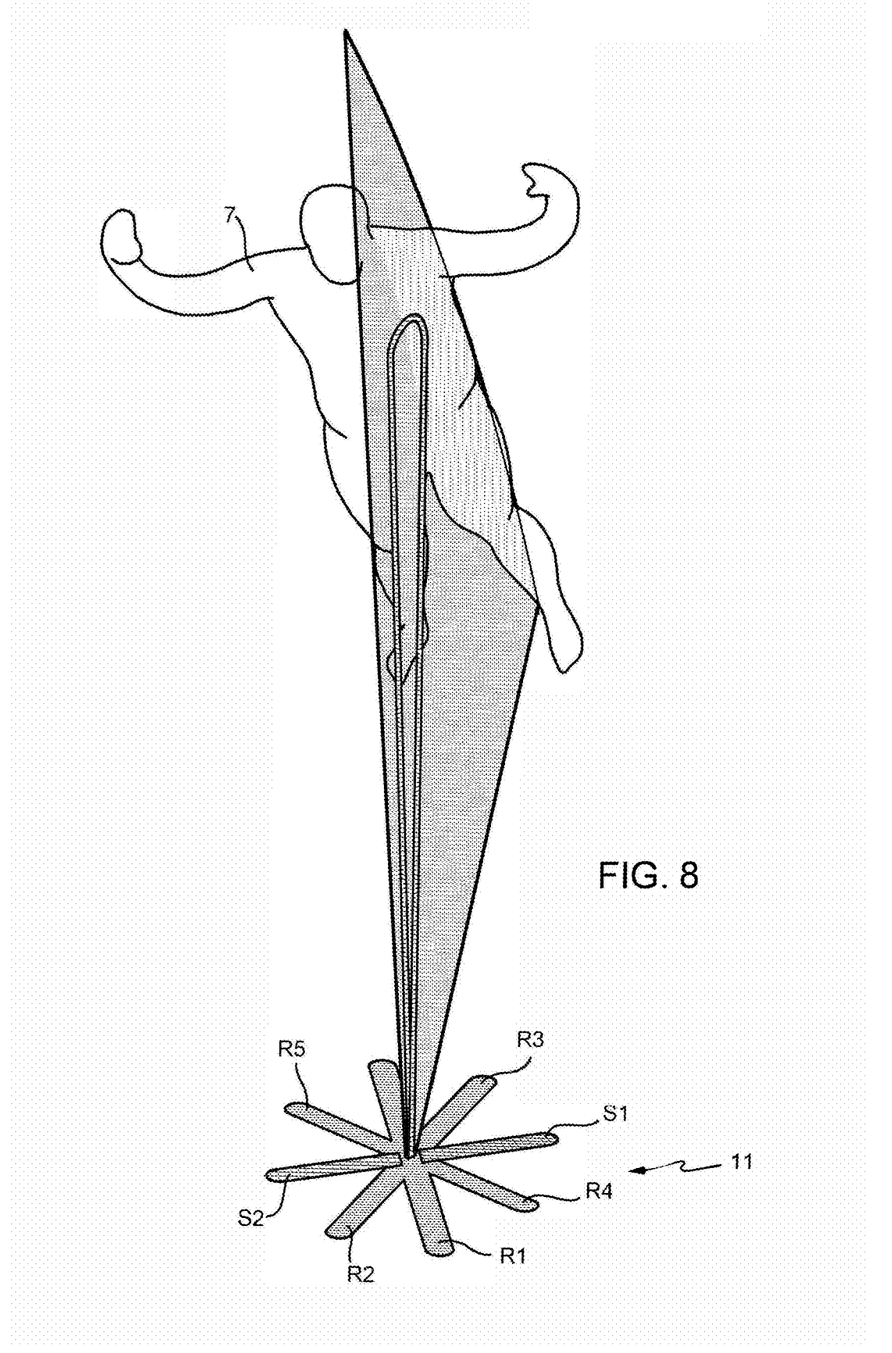
FIG. 8 shows examples of transmission of a fan beam and the formation, in reception, of a pencil beam during an imaging step of the method in FIG. 4.

For a better understanding of the method for imaging underwater objects according to a second aspect of examples of the present invention, FIG. 8 shows:

an example of transmission, by the underwater antenna unit 11 (in particular, during the azimuth scanning performed in the aforementioned imaging step—block 62), of a very narrow fan beam in azimuth that irradiates a corresponding portion (a kind of "slice") of a submerged statue 7; and also an example of the formation, based on the corresponding echo signal received by the underwater antenna unit 11, of a pencil beam pointed towards a point of said portion of the submerged statue 7.

Figure 9:
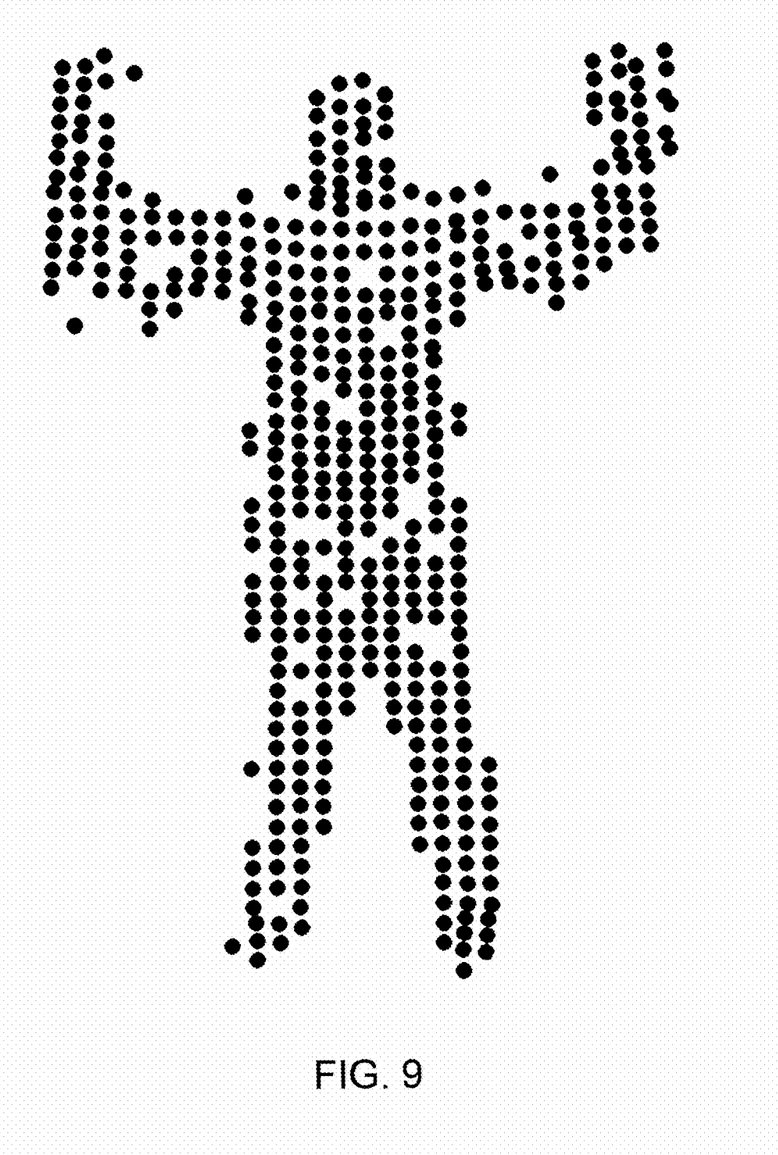
FIG. 9 shows an example of an image created by carrying out said imaging step.

In addition, FIG. 9 shows an example of an image of the submerged statue 7 formed by carrying out the aforementioned imaging step (block 62).

Unlike the detection step (block 61), where only a few active and passive electro-acoustic transducers arranged in the central area of the underwater antenna unit 11 are used, all of the active and passive electro-acoustic transducers of the underwater antenna unit 11 are used in the imaging step (block 62).

Conveniently, during the imaging step (block 62), the transmitting arrays S1 and S2 transmit acoustic pulses of short duration (for example, a duration of 5 carrier cycles), in particular of shorter duration than the pulses transmitted during the detection step (block 61).

For each pulse transmitted during the imaging step (block 62), the listening time is related to a predetermined time window around the time corresponding to the focusing distance.

Conveniently, an opportune analogue-digital conversion is also applied to the echo signals received during the imaging step (block 62).

As previously explained, during the imaging step (block 62), the active electro-acoustic transducers are fed with square-wave excitation signals, opportunely delayed and with the first half period opportunely choked with respect to the predetermined grid of points located in the three-dimensional focusing region, so as to transmit harmonic fundamentals of opportune phase in water that coherently recombine at said three-dimensional focusing region, where, in consequence, a wave of amplitude $N_s$ times the amplitude of the fundamental is produced.

In particular, in transmission, the time delays between the pulses and the phases of the harmonic carriers are determined on the basis of the focusing distance and the azimuth pointing angle, while in reception, the delay index matrices to apply to the samples of the received echo signals are determined as a function of the distance and the azimuth and elevation angles.

It should also be noted that the use of square-wave excitation, since it implies the use of very simple and therefore very inexpensive excitation elements (such as electronic switches), is a cheaper solution with respect to the use of sinusoidal excitation, which, instead, entails the use of more sophisticated and consequently more expensive excitation elements.

Furthermore, the use of square-wave excitation also enables totally eliminating the power amplification stage normally employed in all known types of underwater acoustic imaging systems.

Moreover, it important to note that the use of square-wave excitation could also be advantageous in underwater acoustic systems of a non-imaging type, such as sonar-type systems for example.

Furthermore, it is important to stress that the geometry of the underwater antenna unit 11 enables significant savings in the number of operations necessary for the beamforming processing.

The combined use of both aspects of examples of the present invention (e.g. the combined use of the underwater antenna unit according to the first aspect and the method for imaging underwater objects according to the second aspect) proves to be particularly advantageous, as previously described in detail.

In any case, it is most important to highlight the fact that each of the two distinctive aspects of examples of the present invention can be advantageously implemented independently of the other.

In particular, the underwater antenna unit according to the first aspect of the present invention can be advantageously used, without requiring modifications, in combination with any technique/methodology for imaging underwater objects.

In the same way, the method for imaging underwater objects according to the second aspect of the present invention can also be advantageously used, without requiring modifications, in combination with any underwater transceiver antenna of an electro-acoustic type.

The numerous advantages of examples of the present invention are immediately evident from the foregoing description.

In particular, it is important to underline the fact that examples of the present invention may ensure adequate performance and image resolutions in search, location, identification and salvage applications of underwater objects (such as, for example, archaeological finds or submerged wrecks, sunken sea/submarine/amphibious craft, etc.).

Moreover, unlike known types of underwater acoustic imaging systems, example underwater acoustic imaging systems according to the present invention area low-cost system capable of providing high-resolution 3D images of underwater objects, conveniently in real time and also at a short distance.

The invention claimed is:

1. An acoustic system for the imaging of underwater objects, comprising an underwater transceiver antenna of electro-acoustic type, and control and processing means configured to carry out an imaging step including:

transmitting, by means of the underwater transceiver antenna and for each azimuth angle included in a predetermined range of azimuth angles, a corresponding acoustic pulse by using a fan beam pointed at said azimuth angle and having a predetermined width in azimuth and a predetermined width in elevation, wherein said predetermined width in elevation is greater than said predetermined width in azimuth, and feeding the underwater transceiver antenna with excitation signals such as to cause a coherent recombination of corresponding acoustic signals transmitted in water at a three-dimensional focusing region located at a predetermined focusing distance from the underwater transceiver antenna, at which predetermined focusing distance an underwater object is located;

wherein the acoustic pulses are transmitted by varying azimuth pointing of the fan beam so as to perform a complete scan of the predetermined range of azimuth angles;

for each acoustic pulse transmitted, receiving a corresponding echo signal by means of the underwater transceiver antenna;

processing the received echo signals by performing a beamforming method so as to compute a three-dimensional digital map of powers associated with a predetermined grid of points located in the three-dimensional focusing region; wherein the received echo signals are processed by forming pencil beams, each of which is pointed at a corresponding point of said predetermined grid; and processing the three-dimensional digital map of powers by performing an edge detection method so as to form an image of the underwater object.

2. The system of claim 1, wherein the control and processing means are configured to carry out the imaging step by feeding the underwater transceiver antenna with square-wave excitation signals having predetermined delays such as to cause a coherent recombination of corresponding acoustic signals transmitted in water at the three-dimensional focusing region.

3. The system according to claim 1, wherein the control and processing means are configured to carry out also a detection step including:

operating the underwater transceiver antenna to transmit isotropic acoustic pulses and to receive corresponding echo signals;

computing average powers of samples of said echo signals by using a sliding window of integration of squared amplitudes of the samples of said echo signals;

weighting the computed average powers by an exponential function of compensation for spherical divergence attenuation; and detecting an underwater object on the basis of the weighted average powers and of a detection threshold.

4. The system of claim 3, wherein the control and processing means are configured to carry out the detection step by feeding the underwater transceiver antenna with square-wave excitation signals.

5. The system according to claim 3, wherein the control and processing means are further configured to:

compute a distance, from the underwater transceiver antenna, of an underwater object detected in the detection step; and carry out the imaging step by using said computed distance as the predetermined focusing distance.

6. The system according to claim 3, wherein the underwater transceiver antenna comprises active electro-acoustic transducers and passive electro-acoustic transducers; and wherein the control and processing means are configured to carry out the detection step by operating:

in transmission, active electro-acoustic transducers arranged in a central region of said underwater transceiver antenna; and in reception, passive electro-acoustic transducers arranged in said central region of the underwater transceiver antenna.

7. The system according to claim 1, wherein the underwater transceiver antenna comprises:

a transmitting antenna that includes two arrays of active electro-acoustic transducers lying on one and the same plane; and a receiving antenna that includes five arrays of passive electro-acoustic transducers lying on said plane;

wherein:

a first array of passive electro-acoustic transducers mainly extends along a first rectilinear direction lying on said plane;

the two arrays of active electro-acoustic transducers mainly extend along a second rectilinear direction that lies on said plane, is perpendicular to the first rectilinear direction and intersects said first rectilinear direction at a point identifying a phase centre of the underwater transceiver antenna;

the two arrays of active electro-acoustic transducers extend along the second rectilinear direction, each on a respective side with respect to the phase centre;

the first array of passive electro-acoustic transducers extends through the phase centre and on both sides with respect to said phase centre along the first rectilinear direction;

a second and a third array of passive electro-acoustic transducers mainly extend along a third rectilinear direction that lies on said plane, passes through the phase centre and is inclined by 45° with respect to both the first rectilinear direction and the second rectilinear direction;

the second and the third array of passive electro-acoustic transducers extend along the third rectilinear direction, each on a respective side with respect to the phase centre;

a fourth and a fifth array of passive electro-acoustic transducers mainly extend along a fourth rectilinear direction that lies on said plane, passes through the phase centre and is inclined by 45° with respect to both the first rectilinear direction and the second rectilinear direction and by 90° with respect to the third rectilinear direction; and the fourth and the fifth array of passive electro-acoustic transducers extend along the fourth rectilinear direction, each on a respective side with respect to the phase centre.

8. The system of claim 7, wherein each of the two arrays of active electro-acoustic transducers includes respective active electro-acoustic transducers spaced apart from one another according to a first spacing law; and wherein each of the five arrays of passive electro-acoustic transducers includes respective passive electro-acoustic transducers spaced apart from one another according to a second spacing law.

9. The system of claim 8, wherein:

in each of the two arrays of active electro-acoustic transducers, the spacing between the barycentres of adjacent active electro-acoustic transducers increases with increasing distance from the phase centre according to a first nonlinear law; and in each of the five arrays of passive electro-acoustic transducers, the spacing between the barycentres of adjacent passive electro-acoustic transducers increases with increasing distance from the phase centre according to a second nonlinear law.

10. A non-transitory machine readable computer program product comprising software code portions that are:
executable by electronic processing means of an underwater acoustic system comprising an underwater transceiver antenna; and
such as to cause, when executed, said electronic processing means to become configured as the control and processing means of the system claimed in claim 1.

* * * * *